(12) United States Patent
Wirtz

(10) Patent No.: US 8,622,447 B1
(45) Date of Patent: Jan. 7, 2014

(54) CELLULAR TELEPHONE SUPPORT DEVICE

(76) Inventor: Craig G. Wirtz, Long Beach, CA (US)

(*) Notice: Subject to any disclaimer, the term of this patent is extended or adjusted under 35 U.S.C. 154(b) by 44 days.

(21) Appl. No.: 13/489,757

(22) Filed: Jun. 6, 2012

Related U.S. Application Data

(60) Provisional application No. 61/571,179, filed on Jun. 22, 2011.

(51) Int. Cl.
*B65G 7/12* (2006.01)

(52) U.S. Cl.
USPC ............................................. 294/25; 224/217

(58) Field of Classification Search
USPC .......... 294/25, 137, 142; 361/814; 455/575.1, 455/575.6, 575.8; 150/154, 156; 224/217, 224/218, 930
See application file for complete search history.

(56) References Cited

U.S. PATENT DOCUMENTS

| | | | |
|---|---|---|---|
| 2,283,988 A * | 5/1942 | Heath | 401/6 |
| 5,938,137 A | 8/1999 | Poulson | |
| 6,550,108 B2 | 4/2003 | Pratl | |
| 7,661,567 B2 | 2/2010 | Myers | |
| 2004/0013279 A1* | 1/2004 | Takeda | 381/312 |
| 2005/0205623 A1* | 9/2005 | Buntain | 224/217 |

* cited by examiner

*Primary Examiner* — Stephen Vu
(74) *Attorney, Agent, or Firm* — Emery L. Tracy

(57) ABSTRACT

A cellular telephone support device for releasably holding a cellular telephone having a top edge and a bottom edge is provided. The support device comprises a main support member having a first side, a second side, a first edge, and a second edge. A slotted first opening formed in the first edge. A second slotted opening is formed in the second edge. A ring attachment is positioned on the first side. A first clamping member is slidably receivable within the first slotted opening. A second clamping member is slidably receivable within the second slotted opening of the second edge. Upon positioning the cellular telephone against the second side, the first clamping member is slidable against the top edge of the telephone and the second clamping member is slidable against the bottom edge of the telephone thereby releasably securing the telephone between the first clamping member and the second clamping member.

20 Claims, 1 Drawing Sheet

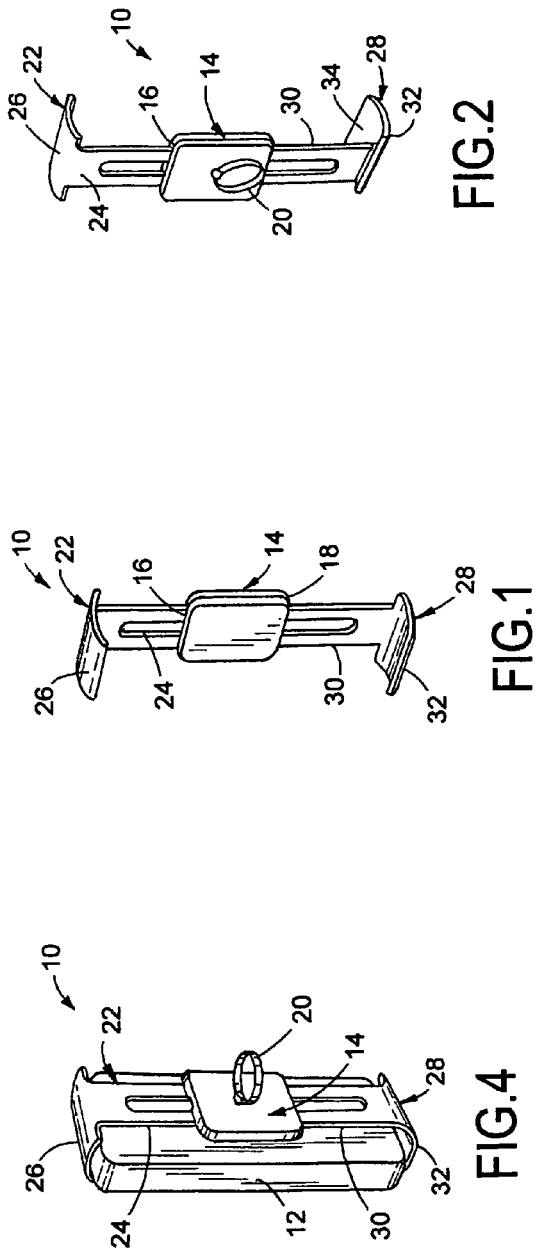

CELLULAR TELEPHONE SUPPORT DEVICE

The present application claims the benefit of priority of pending provisional patent application Ser. No. 61/571,179, filed on Jun. 22, 2011, entitled "Cellular Telephone Support Device".

BACKGROUND OF THE INVENTION

1. Field of the Invention

This invention relates generally to a cellular telephone support device and, more particularly, the invention relates to a cellular telephone support device easily secured to any standard cellular telephone and which is designed expressly to afford the user greater control and a more comfortable hold of their cellular equipment.

2. Description of the Prior Art

While there is little doubt that cellular telephones are extremely useful devices, they do little good if dropped or broken. When utilizing a cellular phone, maintaining a firm hold on the phone is of utmost concern. Should one pick up their phone with wet or slippery hands, or fail to maintain a firm grasp, the result can be that they drop their phone, damaging their expensive cellular equipment. As cellular telephones generally range in price from anywhere between fifty dollars to upwards of several hundred dollars for certain models, dropping a cell phone can be a costly mistake. Further, in this modern era, where cellular telephones boast digital address books and appointment calendars, breaking one's phone can result in an entire roster of contacts and information regarding important scheduled meetings being irrevocably lost.

SUMMARY

The present invention is a cellular telephone support device for releasably holding a cellular telephone. The cellular telephone has a top edge and a bottom edge. The support device comprises a main support member having a first side, a second side substantially opposite the first side, a first edge between the first side, and the second side and a second edge opposite the first edge between the first side and the second side. A slotted first opening is formed in the first edge and a second slotted opening formed in the second edge. A ring attachment is positioned on the first side of the main support member. A first clamping member is slidably receivable within the first slotted opening of the first edge. A second clamping member is slidably receivable within the second slotted opening of the second edge. Upon positioning the cellular telephone against the second side of the main support member, the first clamping member is slidable against the top edge of the cellular telephone and the second clamping member is slidable against the bottom edge of the cellular telephone thereby releasably securing the cellular telephone between the first clamping member and the second clamping member.

In addition, the present invention includes a method for releasably holding a cellular telephone. The cellular telephone has a top edge and a bottom edge. The method comprises providing a main support member having a first side, a second side substantially opposite the first side, a first edge between the first side and the second side, and a second edge opposite the first edge between the first side and the second side, forming a slotted first opening in the first edge, forming a second slotted opening in the second edge, positioning a ring attachment on the first side of the main support member, slidably mounting a first clamping member within the first slotted opening of the first edge, slidably mounting a second clamping member within the second slotted opening of the second edge, positioning the cellular telephone against the second side of the main support member, sliding the first clamping member against the top edge of the cellular telephone, sliding the second clamping member against the bottom edge of the cellular telephone, and releasably securing the cellular telephone between the first clamping member and the second clamping member.

The present invention further includes a cellular telephone support device for releasably holding a cellular telephone. The cellular telephone has a top edge and a bottom edge. The support device comprises a main support member having a first side, a second side substantially opposite the first side, a first edge between the first side and the second side, and a second edge opposite the first edge between the first side and the second side. A slotted first opening is formed in the first edge and a second slotted opening formed in the second edge. A ring attachment is pivotally mounted to the first side of the main support member. A first clamping member is slidably receivable within the first slotted opening of the first edge with the first clamping member having a first clamp contactable with the top edge of the cellular telephone. A second clamping member is slidably receivable within the second slotted opening of the second edge with the second clamping member having a second clamp contactable with the bottom edge of the cellular telephone. Upon positioning the cellular telephone against the second side of the main support member, the first clamping member is slidable against the top edge of the cellular telephone and the second clamping member is slidable against the bottom edge of the cellular telephone thereby releasably securing the cellular telephone between the first clamping member and the second clamping member.

BRIEF DESCRIPTION OF THE DRAWINGS

FIG. 1 is a front perspective view illustrating a cellular telephone support device, constructed in accordance with the present invention;

FIG. 2 is a rear perspective view illustrating the cellular telephone support device, constructed in accordance with the present invention;

FIG. 3 is a front perspective view illustrating the cellular telephone support device, constructed in accordance with the present invention, with a cellular telephone releasably mounted with the support device;

FIG. 4 is a rear perspective view illustrating the cellular telephone support device, constructed in accordance with the present invention, with the cellular telephone releasably mounted with the support device; and FIG. 5 is a front perspective view illustrating the cellular telephone support device, constructed in accordance with the present invention, with the cellular telephone releasably mounted with the support device and a user holding the support device via an integrated finger ring.

DETAILED DESCRIPTION OF THE PREFERRED EMBODIMENTS

As illustrated in FIGS. 1-5, the present invention is a cellular telephone support device, indicated generally at 10, for releasably holding a cellular telephone 12. The support device 10 of the present invention is easily secured to any standard cellular telephone 12 and affords the user greater control and a more comfortable hold of their cellular telephone 12.

The cellular telephone support device 10 of the present invention includes a main support member 14 having a first side and a second side substantially opposite the first side. The main support member 14 has a first slotted opening 16 formed in a first edge between the first side and the second side and a second slotted opening 18 formed in a second edge between the first side and the second side. The first edge of the main support 14 member is opposite the second edge of the main support member 14.

Centrally positioned on the first side of the main support member 14 of the cellular telephone support device 10 of the present invention is a ring attachment 20. Preferably, the ring attachment 20 is circular shaped unit measuring approximately two (2") inches in diameter. In a preferred embodiment, the ring attachment 20 is swivelly mounted to the first side of the main support member 14 via a sturdy pivot joint allowing three hundred and sixty (360°) degrees freedom of rotation of the ring attachment 20. In addition, the ring attachment 20 enables the user to fold the ring attachment 20 flush against the back of the cellular phone 12.

In addition, the cellular telephone support device 10 of the present invention has a first clamping member 22 slidably receivable within the first slotted opening 16 of the first edge. The first clamping member 22 has an elongated first sliding portion 24 having a first end and a second end. The first end of the first sliding portion 24 is moveable in and out of the first slotted opening 16 and, preferably, releasably maintained in a desired position by friction. Secured to the second end of the first sliding portion 24 is a first clamp 26. The first clamp 26 is sized and shaped for receiving an end of the cellular telephone 12. In this manner, preferably, the first clamp 26 has a substantially curved cross-sectional configuration to accommodate the curvature of the end of the cellular telephone 12.

The cellular telephone support device 10 of the present invention further has a second clamping member 28 slidably receivable within the second slotted opening 18 of the second edge. The second clamping member 28 has an elongated second sliding portion 30 having a first end and a second end. The first end of the second sliding portion 30 is moveable in and out of the second slotted opening 18 and, preferably, releasably maintained in a desired position by friction. Secured to the second end of the second sliding portion 30 is a second clamp 32. The second clamp 32 is sized and shaped for receiving an opposite end of the cellular telephone 12. In this manner, preferably, the second clamp 32 has a substantially curved cross-sectional configuration to accommodate the curvature of the opposite end of the cellular telephone 12.

It should be noted that while the cellular telephone support device 10 of the present invention has been described and illustrated as having the first sliding portion 24 and the second sliding portion 30 being releasably maintained relative to the main support member 14 by friction, it is within the scope of the present invention to maintain the position of the first sliding portion 24 and the second sliding portion 30 by other means including, but not limited to, set screws and other mechanical securing means.

Also, in a preferred embodiment of the cellular telephone support device 10 of the present invention, the portion of the first clamp 26 and the second clamp 32 that contacts the cellular telephone 12 has a rubber grip material or other nonskid coating 34 for gripping the surface of the cellular telephone 12 thereby ensuring a secure hold and protecting the finishes of the cellular telephone 12.

The cellular telephone support device 10 of the present invention is fully adjustable to accommodate a variety of cellular telephone models 12, or can be produced in sizes to accommodate specific cellular telephones 12. Preferably manufactured primarily of heavy-duty, shatterproof plastic and rubber material and featuring aluminum components, the support device 10 is comprised of a durable plastic clamp mechanism 22, 28 designed to easily snap over the back of the cellular telephone 12. Sized and shaped appropriately to abut flush against the back and sides of the cellular telephone 12, the support device 10 can be produced in neutral shades of silver or black to discreetly blend with the cellular phone, or the support device 10 can be offered in a variety of vibrant colors, adding a splash of whimsy to one's cellular equipment.

The manner of use of the cellular telephone support device 10 of the present invention will now be described. It will be understood by those skilled in the art that the manner of use of the support device 10 described herein is merely one method of use and other methods of use of the support device 10 are within the scope of the present invention.

Use of the cellular telephone support device 10 of the present invention is very simple and straight forward. Grasping their cellular telephone 12 in one hand, the user positions the second side of the main support member 12 of the support device 10 with the first clamping member 22 and the second clamping member 28 extended over the ends of the cellular telephone 12. Next, the user moves the first clamp 26 over the end of the cellular telephone 12 and the second clamp 32 over the other end of the cellular telephone 12 with friction or other mechanical securing mechanism holding the first and second clamping members 22, 28 in place. Properly applied, the support device 10 securely hugs the back and sides of the cellular telephone 12, while the rubber material prevents the cellular telephone 12 from sliding about during use. In order to make a call, the user holds their cellular telephone 12 in hand, sliding one or two fingers through the adjustable, circular shaped ring attachment 20. In this manner, the user is afforded a more secure hold on their cellular telephone 12. The support device 10 can also be employed when sending text messages, surfing the web or entering data into their cellular telephone 12, allowing the user to maintain a firm and reliable grip when holding the cellular telephone 12 with their non-dominant hand. After the call or designated action is complete, the user folds the ring attachment 20 flush against the back of the cellular telephone 12, storing their cellular telephone 12 away in a pocket or holster until again needed.

The cellular telephone support device 10 of the present invention offers users many significant benefits and advantages. Foremost, the support device 10 provides users a practical way in which to maintain a firm grip on their cellular telephone 12 during use. A cleverly designed ring attachment 20, through which the user slides his or her finger in order to maintain a more secure hold, the support device 10 effectively prevents the user from dropping their cellular telephone 12 when making a call. Fun to use, users will appreciate that the ring attachment 20 has three hundred and sixty (360°) degrees freedom of rotation, thus enabling them to easily adjust their cellular telephone 12 to accommodate the most comfortable position within their hand, simply by rotating the ring attachment 20. Ideal for use when making an important call or when chatting with a friend, the support device 10 proves especially invaluable when inputting data into the cellular telephone 12. Simply stated, when holding the cellular telephone 12 with their non-dominant hand and texting, checking emails or inputting data with their dominant hand, the support device 10 affords the user a constant and reliable grip. Regardless of whether one has recently applied hand lotion or just washed their hands, the ring attachment 20 effectively prevents the cellular telephone 12 from slipping out of the user's hand and crashing to the floor. As such, costly cellular telephone 12 repairs and replacement costs are effectively avoided.

The cellular telephone support device 10 of the present invention offers a safe and secure means of holding one's cellular telephone 12. Simple in design and practical in function, the support device 10 proves a useful accessory for anyone who owns a cellular telephone 12.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A cellular telephone support device for releasably holding a cellular telephone, the cellular telephone having a top edge and a bottom edge, the support device comprising:
   a main support member having a first side and a second side substantially opposite the first side, the main support member having a first edge between the first side and the second side and a second edge opposite the first edge between the first side and the second side;
   a slotted first opening formed in the first edge;
   a second slotted opening formed in the second edge;
   a ring attachment positioned on the first side of the main support member;
   a first clamping member slidably receivable within the first slotted opening of the first edge; and
   a second clamping member slidably receivable within the second slotted opening of the second edge;
   wherein upon positioning the cellular telephone against the second side of the main support member, the first clamping member is slidable against the top edge of the cellular telephone and the second clamping member is slidable against the bottom edge of the cellular telephone thereby releasably securing the cellular telephone between the first clamping member and the second clamping member.

2. The support device of claim 1 wherein the ring attachment is centrally positioned on the first side of the main support member.

3. The support device of claim 1 wherein ring attachment is swivelly mounted to the first side of the main support member via a pivot joint, the pivot joint allowing three hundred and sixty (360°) degrees of rotation of the ring attachment relative to the first side of the main support member.

4. The support device of claim 1 wherein the ring attachment is foldable against the first side of the main support member.

5. The support device of claim 1 wherein the first clamping member has an elongated first sliding portion having a first end and a second end and a first clamp secured to the second end of the first sliding portion, the first end of the first sliding portion slidably moveable in and out of the first slotted opening.

6. The support device of claim 5 wherein the second clamping member has an elongated second sliding portion having a first end and a second end and a second clamp secured to the second end of the second sliding portion, the first end of the second sliding portion slidably moveable in and out of the second slotted opening.

7. The support device of claim 6 wherein the first sliding portion and the second sliding portion releasably securable within the first slotted opening and the second slotted opening, respectively, by friction.

8. The support device of claim 6 wherein the first clamp and the second clamp are sized and shaped for receiving the top end and the bottom end, respectively of the cellular telephone.

9. The support device of claim 8 wherein the first clamp and the second clamp have a substantially curved cross-sectional configuration accommodating a curvature of the top end and the bottom end, respectively, of the cellular telephone.

10. The support device of claim 6 wherein the first clamp has an inner surface contactable with the top end of the cellular telephone and the second clamp has an inner surface contactable with the bottom end of the cellular telephone, and further comprising:
    a first non-skid grip mounted to the inner surface of the first clamp; and
    a second non-skid grip mounted to the inner surface of the second clamp.

11. The support device of claim 1 wherein the second side of the main support member contacts the cellular telephone.

12. A method for releasably holding a cellular telephone, the cellular telephone having a top edge and a bottom edge, the method comprising:
    providing a main support member having a first side and a second side substantially opposite the first side, the main support member having a first edge between the first side and the second side and a second edge opposite the first edge between the first side and the second side;
    forming a slotted first opening in the first edge;
    forming a second slotted opening in the second edge;
    positioning a ring attachment on the first side of the main support member;
    slidably mounting a first clamping member within the first slotted opening of the first edge;
    slidably mounting a second clamping member within the second slotted opening of the second edge;
    positioning the cellular telephone against the second side of the main support member;
    sliding the first clamping member against the top edge of the cellular telephone;
    sliding the second clamping member against the bottom edge of the cellular telephone; and
    releasably securing the cellular telephone between the first clamping member and the second clamping member.

13. A cellular telephone support device for releasably holding a cellular telephone, the cellular telephone having a top edge and a bottom edge, the support device comprising:
    a main support member having a first side and a second side substantially opposite the first side, the main support member having a first edge between the first side and the second side and a second edge opposite the first edge between the first side and the second side;
    a slotted first opening formed in the first edge;
    a second slotted opening formed in the second edge;
    a ring attachment pivotally mounted to the first side of the main support member;
    a first clamping member slidably receivable within the first slotted opening of the first edge, the first clamping member having a first clamp contactable with the top edge of the cellular telephone; and
    a second clamping member slidably receivable within the second slotted opening of the second edge, the second clamping member having a second clamp contactable with the bottom edge of the cellular telephone;

wherein upon positioning the cellular telephone against the second side of the main support member, the first clamping member is slidable against the top edge of the cellular telephone and the second clamping member is slidable against the bottom edge of the cellular telephone thereby releasably securing the cellular telephone between the first clamping member and the second clamping member.

14. The support device of claim 13 wherein the ring attachment is centrally positioned on the first side of the main support member.

15. The support device of claim 13 wherein the ring attachment is foldable against the first side of the main support member.

16. The support device of claim 13 wherein the first clamping member has an elongated first sliding portion having a first end and a second end, wherein the first clamp is secured to the second end of the first sliding portion, the first end of the first sliding portion is slidably moveable in and out of the first slotted opening.

17. The support device of claim 16 wherein the second clamping member has an elongated second sliding portion having a first end and a second end, wherein the second clamp is secured to the second end of the second sliding portion, the first end of the second sliding portion slidably moveable in and out of the second slotted opening.

18. The support device of claim 16 wherein the first sliding portion and the second sliding portion releasably securable within the first slotted opening and the second slotted opening, respectively, by friction.

19. The support device of claim 16 wherein the first clamp and the second clamp are sized and shaped for receiving the top end and the bottom end, respectively of the cellular telephone, the first clamp and the second clamp having a substantially curved cross-sectional configuration accommodating a curvature of the top end and the bottom end, respectively, of the cellular telephone.

20. The support device of claim 16 wherein the first clamp has an inner surface contactable with the top end of the cellular telephone and the second clamp has an inner surface contactable with the bottom end of the cellular telephone, and further comprising:

a first non-skid grip mounted to the inner surface of the first clamp; and a second non-skid grip mounted to the inner surface of the second clamp.

\* \* \* \* \*